US008652239B2

(12) United States Patent
Ma et al.

(10) Patent No.: US 8,652,239 B2
(45) Date of Patent: Feb. 18, 2014

(54) HIGH PERMEANCE SULFUR TOLERANT PD/CU ALLOY MEMBRANES

(75) Inventors: Yi Hua Ma, Worcester, MA (US); Natalie Pomerantz, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 339 days.

(21) Appl. No.: 13/099,688

(22) Filed: May 3, 2011

(65) Prior Publication Data

US 2011/0303092 A1 Dec. 15, 2011

Related U.S. Application Data

(60) Provisional application No. 61/330,511, filed on May 3, 2010.

(51) Int. Cl.
*B01D 53/22* (2006.01)
*B01D 71/02* (2006.01)
*C25D 5/50* (2006.01)

(52) U.S. Cl.
USPC ............................ 96/11; 96/4; 95/56; 205/85

(58) Field of Classification Search
USPC ............... 96/4, 11; 95/45, 55, 56; 205/85, 87, 205/148, 184, 265
See application file for complete search history.

(56) References Cited

U.S. PATENT DOCUMENTS

| | | |
|---|---|---|
| 2,958,391 A | 11/1960 | deRosset |
| 3,241,298 A | 3/1966 | Pierce |
| 3,247,648 A | 4/1966 | McKinley |
| 3,350,845 A | 11/1967 | McKinley |
| 3,413,777 A | 12/1968 | Langley et al. |
| 3,428,476 A | 2/1969 | Langley et al. |
| 3,438,178 A | 4/1969 | Betteridge et al. |
| 3,439,474 A | 4/1969 | McKinley |
| 3,717,525 A | 2/1973 | Bultemann |
| 4,056,373 A | 11/1977 | Rubin |
| 4,496,373 A | 1/1985 | Behr et al. |

(Continued)

FOREIGN PATENT DOCUMENTS

| | | |
|---|---|---|
| AU | 2004224365 | 10/2004 |
| AU | 2004224370 | 1/2008 |

(Continued)

OTHER PUBLICATIONS

Ayturk, M.E., "Synthesis, annealing strategies and in-situ characterization of thermally stable composite thin Pd/Ag alloy membranes for $H_2$ separation," Worcester Polytechnic Institute, Ph.D. Thesis, 2007.

(Continued)

*Primary Examiner* — Jason M Greene
(74) *Attorney, Agent, or Firm* — Hamilton, Brook, Smith & Reynolds, P.C.

(57) ABSTRACT

A method of making a membrane permeable to hydrogen gas ($H_2\uparrow$) is disclosed. The membrane is made by forming a palladium layer, depositing a layer of copper on the palladium layer, and galvanically displacing a portion of the copper with palladium. The membrane has improved resistance to poisoning by $H_2S$ compared to a palladium membrane. The membrane also has increased permeance of hydrogen gas compared to palladium-copper alloys. The membrane can be annealed at a lower temperature for a shorter amount of time.

44 Claims, 7 Drawing Sheets

(56) References Cited

U.S. PATENT DOCUMENTS

| | | | |
|---|---|---|---|
| 4,589,891 A | 5/1986 | Iniotakis et al. | |
| 4,689,150 A | 8/1987 | Abe et al. | |
| 4,699,637 A | 10/1987 | Iniotakis et al. | |
| 4,857,080 A | 8/1989 | Baker et al. | |
| 4,902,307 A | 2/1990 | Gavalas et al. | |
| 5,049,167 A | 9/1991 | Castro et al. | |
| 5,139,541 A | 8/1992 | Edlund | |
| 5,205,841 A | 4/1993 | Vaiman | |
| 5,215,729 A | 6/1993 | Buxbaum | |
| 5,217,506 A | 6/1993 | Edlund et al. | |
| 5,255,742 A | 10/1993 | Mikus | |
| 5,258,339 A | 11/1993 | Ma et al. | |
| 5,259,870 A | 11/1993 | Edlund | |
| 5,358,553 A | 10/1994 | Najjar et al. | |
| 5,393,325 A | 2/1995 | Edlund | |
| 5,449,848 A | 9/1995 | Itoh | |
| 5,451,386 A | 9/1995 | Collins et al. | |
| 5,498,278 A | 3/1996 | Edlund | |
| 5,614,001 A | 3/1997 | Kosaka et al. | |
| 5,652,020 A | 7/1997 | Collins et al. | |
| 5,672,388 A | 9/1997 | McHenry et al. | |
| 5,738,708 A | 4/1998 | Peachey et al. | |
| 5,782,959 A | 7/1998 | Yang et al. | |
| 5,782,960 A | 7/1998 | Ogawa et al. | |
| 5,862,858 A | 1/1999 | Wellington et al. | |
| 5,895,769 A | 4/1999 | Lai | |
| 5,899,269 A | 5/1999 | Wellington | |
| 5,904,754 A | 5/1999 | Juda et al. | |
| 5,997,594 A | 12/1999 | Edlund et al. | |
| 6,019,172 A | 2/2000 | Wellington et al. | |
| 6,086,729 A | 7/2000 | Bredesen et al. | |
| 6,152,987 A | 11/2000 | Ma et al. | |
| 6,152,995 A | 11/2000 | Edlund | |
| 6,183,542 B1 | 2/2001 | Bossard | |
| 6,267,801 B1 | 7/2001 | Baake et al. | |
| 6,309,546 B1 | 10/2001 | Herrmann et al. | |
| 6,372,363 B1 | 4/2002 | Krueger | |
| 6,379,524 B1 | 4/2002 | Lee et al. | |
| 6,419,728 B1 | 7/2002 | Edlund | |
| 6,452,276 B1 | 9/2002 | Cohen et al. | |
| 6,475,268 B2 | 11/2002 | Thornton | |
| 6,547,858 B1 | 4/2003 | Edlund et al. | |
| 6,576,350 B2* | 6/2003 | Buxbaum | 428/670 |
| 6,596,057 B2 | 7/2003 | Edlund et al. | |
| 6,730,145 B1 | 5/2004 | Li | |
| 6,916,454 B2 | 7/2005 | Alvin | |
| 6,964,697 B2 | 11/2005 | Pan et al. | |
| 7,018,446 B2 | 3/2006 | Alvin et al. | |
| 7,125,440 B2 | 10/2006 | Bossard et al. | |
| 7,172,644 B2 | 2/2007 | Ma et al. | |
| 7,175,694 B2* | 2/2007 | Ma et al. | 95/56 |
| 7,255,726 B2 | 8/2007 | Ma et al. | |
| 7,390,536 B2 | 6/2008 | Ma et al. | |
| 7,727,596 B2 | 6/2010 | Ma et al. | |
| 8,366,805 B2 | 2/2013 | Ma et al. | |
| 2002/0020298 A1 | 2/2002 | Drost et al. | |
| 2002/0081845 A1 | 6/2002 | Lee et al. | |
| 2002/0083829 A1 | 7/2002 | Edlund et al. | |
| 2002/0141919 A1 | 10/2002 | Alvin | |
| 2002/0164496 A1 | 11/2002 | Saloka et al. | |
| 2002/0175418 A1 | 11/2002 | Cohen et al. | |
| 2003/0068269 A1 | 4/2003 | Matzakos et al. | |
| 2003/0183080 A1 | 10/2003 | Mundschau | |
| 2003/0190486 A1 | 10/2003 | Roa et al. | |
| 2003/0213365 A1 | 11/2003 | Jantsch et al. | |
| 2003/0222015 A1 | 12/2003 | Oyama et al. | |
| 2004/0037962 A1 | 2/2004 | Uemura et al. | |
| 2004/0129135 A1 | 7/2004 | Roark et al. | |
| 2004/0244589 A1 | 12/2004 | Bossard et al. | |
| 2005/0072304 A1 | 4/2005 | Etievant et al. | |
| 2006/0016332 A1 | 1/2006 | Ma et al. | |
| 2006/0141486 A1 | 6/2006 | Coonan et al. | |
| 2006/0188737 A1 | 8/2006 | Roa et al. | |
| 2006/0289351 A1 | 12/2006 | Xiao et al. | |
| 2007/0224399 A1 | 9/2007 | Rabin et al. | |
| 2008/0143015 A1 | 6/2008 | Lee et al. | |
| 2010/0132546 A1 | 6/2010 | Ma et al. | |
| 2011/0030382 A1 | 2/2011 | Eadon et al. | |
| 2013/0104740 A1* | 5/2013 | Perkins et al. | 96/11 |

FOREIGN PATENT DOCUMENTS

| | | |
|---|---|---|
| AU | 2004224371 | 11/2008 |
| AU | 2004237778 | 11/2008 |
| AU | 2005275250 | 7/2009 |
| AU | 2005286952 | 9/2009 |
| AU | 2005286955 | 9/2009 |
| AU | 2005287034 | 9/2009 |
| CA | 2315029 | 12/2008 |
| DE | 101 35 390 A | 2/2003 |
| EP | 1 180 392 | 2/2002 |
| EP | 1 021 682 B1 | 3/2002 |
| EP | 1 208 904 A1 | 5/2002 |
| EP | 1 277 512 A | 1/2003 |
| EP | 1 042 049 | 3/2003 |
| EP | 1 603 660 | 9/2008 |
| EP | 1 622 698 | 1/2010 |
| FR | 2820 988 A | 8/2002 |
| JP | 62-259884 | 11/1987 |
| JP | 02-271901 | 11/1990 |
| JP | 4-346824 | 2/1992 |
| JP | 5-285357 | 2/1993 |
| JP | 5-317662 | 3/1993 |
| JP | 5085702 | 4/1993 |
| JP | 05-123548 | 5/1993 |
| JP | 10-028850 | 2/1998 |
| JP | 2000005580 A | 11/2000 |
| JP | 2001-286742 | 10/2001 |
| JP | 2002/219343 | 6/2002 |
| JP | 2002-219341 | 8/2002 |
| JP | 2002-355537 | 12/2002 |
| JP | 2003290636 A | 10/2003 |
| WO | WO 99/30806 | 6/1999 |
| WO | WO 99/33545 | 7/1999 |
| WO | WO 02/064241 | 8/2002 |
| WO | WO 02/066144 | 8/2002 |
| WO | WO 03/011433 A1 | 2/2003 |
| WO | WO 2004/022480 | 3/2004 |
| WO | WO 2004/085034 | 10/2004 |
| WO | WO 2004/085044 | 10/2004 |
| WO | WO 2004/098751 | 11/2004 |
| WO | WO 2005/075060 A1 | 8/2005 |
| WO | WO 2006/019805 | 2/2006 |
| WO | WO 2006/033267 | 3/2006 |
| WO | WO 2006/034100 | 3/2006 |
| WO | WO 2006/034103 | 3/2006 |
| WO | WO 2008/124062 | 10/2008 |

OTHER PUBLICATIONS

Ayturk, M.E., et al., "Synthesis of composite Pd-porous stainless steel (PSS) membranes with a Pd/Ag intermetallic diffusion barrier," *J. Membr. Sci.,* 285: 385 (2006).
Ayturk, M.E., et al., "Electroless Pd and Ag Deposition Kinetics of the Composite Pd and Pd/AG Membranes Synthesized from Agitated Plating Baths," *J Mem. Sci.,* 330: 233-245 (2009).
Bitler, W.R., et al., "Interdiffusion kinetics of copper with palladium," *Plat. Surf. Finish.,* 72: 60-63 (1985).
Bredesen, R. et al., "High-temperature membranes in power generation with $CO_2$ capture," *Chem. Eng. Process,* 43: 1129-1158 (2004).
Butrymowicz, D.B., et al., "Diffusion in copper and copper alloys. Part IV. Diffusion in systems involving elements of Group VIII," *J. Phys. Chem. Ref. Data,* 5(1): 103-200 (1976).
Donahue, F., and Shippey, F.L., "Kinetics of electroless copper plating. II. Mixed potential analysis," *Plating,* 60: 135-138 (1973).
Donahue, F.M., "Kinetics of electroless copper plating. III. Mass transport effects," *J. Electrochem. Soc.,* 127(1): 51-55 (1980).
Donahue, F.M., "Kinetics of electroless copper plating. V. Mass transport at cylindrical surfaces," *J. Electrochem. Soc.,* 128(11): 2366-2367 (1981).
Donahue, F.M., et al., "Kinetics and electroless copper plating. IV. Empirical rate law for formaldehyde-EDTA baths," *J. Electrochem. Soc.,* 127(11): 2340-2342 (1980).

(56) References Cited

OTHER PUBLICATIONS

Dumesic, J., et al., "Rate of electroless copper deposition by formaldehyde reduction," *J. Electrochem. Soc.*, 121(11): 1405-1412 (1974).
Edlund, D.J. and McCarthy, J., The Relationship Between Intermetallic Diffusion and Flux Decline in Composite-Metal Membranes: Implications for Achieving Long Membrane Lifetime, *J. Mem. Sci.*, 107: 147-153 (1995).
Gao, H., et al., "Electroless plating synthesis, characterization, and permeation properties of Pd-Cu membranes supported on $ZrO_2$ modified porous stainless steel," *J. Membr. Sci.*, 265: 142-152 (2005).
Grashoff, G.J. et al., "The purification of hydrogen: A review of the technology emphasizing the current status of palladium membrane diffusion," *Platinum Met. Rev.*, 27(4): 157-169 (1983).
Gryaznov, V. M., "Metal Containing Membranes for the Production of Ultrapure Hydrogen and the Recovery of Hydrogen Isotopes," *Separation and Purification Methods (now Separation and Purification Reviews)*, 29(2):171-187 (2000).
Gryaznov, V. M., et al., "Preparation and catalysis over Palladium Composite Membranes," *Applied Catalysis A: General*, 96(1):15-23 (1993).
Guazzone, F. and Ma, Y.H., "Leak growth mechanism in composite Pd membranes prepared by the electroless deposition method," *AICHE J.*, 54(2): 487-494 (2008).
Guazzone, F., "Engineering of substrate surface for the synthesis of ultra-thin composite palladium and palladium-copper membranes for hydrogen separation," Worcester Polytechnic Institute, Ph.D. Thesis, 2005.
Guazzone, F., et al., "Microstrains and stresses analysis in electroless deposited thin Pd films," *Ind. Eng. Chem. Res.*, 45: 8145-8153 (2006).
Howard, B.H., et al., "Hydrogen permeance of palladium-copper alloy membranes over a wide range of temperatures and pressures," *J. Membr. Sci.*, 241: 207-218 (2004).
Kajiwara, M., et al., "Stability and hydrogen permeation behavior of supported platinum membranes in presence of hydrogen sulfide," *Int. J. Hydrogen Energy.*, 24: 839-844 (1999).
Knapton, A.G., "Palladium alloys for hydrogen diffusion membranes," *Platinum Met. Rev.*, 21(2): 44-50 (1977).
Kulprathipanja, A., et al., "Pd and Pd-Cu membranes: inhibition of $H_2$ permeation by $H_2S$," *J. Membr. Sci.*, 254: 49-62 (2005).
Ma, Y. H., et al., "Characterization of Intermetallic Diffusion Barrier and Alloy Formation for Pd/Cu and Pd/Ag Porous Stainless Steel Composite Membranes," *I & EC Research*, 43:2936-2945 (2004).
Ma, Y.H., et al., "Thin Composite Palladium and Palladium/Alloy Membranes for Hydrogen Separation," *Ann. N.Y. Acad. Sci.*, 984: 346-360 (2003).
Mardilovich, I.P., et al., "Dependence of Hydrogen Flux on The Pore Size and Plating Surface Topology of Asymmetric Pd-Porous Stainless Steel Membranes," *Desalination*, 144:85-89 (2002).
Mardilovich, P.P., et al., "Defect-free palladium membranes on porous stainless-steel support," *AIChE J.*, 44(2): 310-322 (1998).
Molenaar, A., et al., "Kinetics of electroless copper plating with EDTA as the complexing agent for cupric ions," *Plating*, 61: 238-242 (1974).
Morreale, B.D., et al., "Effect of hydrogen-sulfide on the hydrogen permeance of palladium-copper alloys at elevated temperatures," *J. Membr. Sci.*, 241: 219-224 (2004).
Mundschau, M.V., et al., "Dense inorganic membranes for production of hydrogen from methane and coal with carbon dioxide sequestration," *Catal. Today*, 118:12-23 (2006).
Nam, S.-E., et al., "Hydrogen Separation by Pd Alloy Composite Membranes," *J. Membrane Sci.*, 192:177-185 (2001).
Ozaki, T., et al., "Preparation of Palladium-coated V and V-15 Ni Membranes for Hydrogen Purification by Electroless Plating Technique," *Int. J. Hydrogen Energy*, 28:297 (2003).
Pan, X., et al., "Low-temperature $H_2$ and $N_2$ transport through thin $Pd_{66}Cu_{34}H_x$ layers," *Catal. Today*, 104: 225-230 (2005).
PCT/US2004/008372: Notification of Transmittal of the International Preliminary Report on Patentability dated May 18, 2005.
PCT/US2004/008372: Notification of Transmittal of the International Search Report and the Written Opinion of the International Search Authority, or the Declaration dated Aug. 13, 2004.
PCT/US2004/008372: Written Opinion of the International Preliminary Examining Authority dated Feb. 24, 2005.
PCT/US2004/008382: Notification of Transmittal of the International Preliminary Report on Patentability dated Jul. 8, 2005.
PCT/US2004/008382: Notification of Transmittal of the International Search Report and the Written Opinion of the International Searching Authority, or the Declaration dated Sep. 28, 2004.
PCT/US2004/008383: Notification of Transmittal of the International Preliminary Report on Patentability dated Jun. 3, 2005.
PCT/US2004/008383: Notification of Transmittal of the International Search Report and the Written Opinion of the International Searching Authority, or the Declaration dated Aug. 19, 2004.
PCT/US2004/008383: Written Opinion of the International Preliminary Examining Authority dated Feb. 24, 2005.
PCT/US2004/013333: Notification of Transmittal of the International Preliminary Report on Patentability dated Aug. 5, 2005.
PCT/US2004/013333: Notification of Transmittal of the International Search Report and the Written Opinion of the International Searching Authority, or the Declaration dated Sep. 27, 2004.
PCT/US2005/024831: Notification Concerning Transmittal of International Preliminary Report on Patentability dated Feb. 1, 2007.
PCT/US2005/024831: Notification of Transmittal of the International Search Report and the Written Opinion of the International Searching Authority, or the Declaration dated Feb. 7, 2006.
PCT/US2005/033267: Notification of Transmittal of the International Search Report and the Written Opinion of the International Searching Authority, or the Declaration dated Feb. 28, 2006.
PCT/US2005/033289: Notification of Transmittal of the International Search Report and the Written Opinion of the International Search Authority, or the Declaration dated Feb. 14, 2006.
PCT/US2005/033295: Notification of Transmittal of the International Search Report and the Written Opinion of the International Searching Authority, or the Declaration dated Feb. 14, 2006.
PCT/US2008/004403: Notification Concerning Transmittal of International Preliminary Report on Patentability dated Oct. 15, 2009.
PCT/US2008/004403: Notification of Transmittal of the International Search Report and the Written Opinion of the International Searching Authority, or the Declaration dated Jun. 12, 2008.
Pomerantz et al., "Isothermal solid-state transformation kinetics applied to Pd/Cu alloy membrane fabrication," *AIChE J.*, 56(12): 3062-3073 (2010).
Pomerantz, N. and Ma, Y.H., "Effect of $H_2S$ on the Performance and Long-Term Stability of Pd/Cu Membranes," *Ind. Eng. Chem. Res.*, 48: 4030-4039 (2009).
Roa, F., "Preparation and Characterization of Pd-Cu Composite Membranes for Hydrogen Separation," *Chem. Eng. J.*, 93:11-22 (2003).
Roa, F., and Way, J.D., "Influence of alloy composition and membrane fabrication on the pressure dependence of the hydrogen flux of palladium-copper membranes," *Ind. Eng. Chem. Res.*, 42: 5827 (2003).
Roa, F., et al., "The Influence of Alloy Composition on the $H_2$ Flux of Composite Pd-Cu Membranes," *Desalination*, 147:411-416 (2002).
Saini, A., "An investigation of the cause of leak formation in palladium composite membranes," Worcester Polytechnic Institute, M.S. Thesis, 2006.
Shirasaki, Y., et al., "Development of membrane reformer system for highly efficient hydrogen production from natural gas," *Int. J. Hydrogen Energy*, 34: 4482-4487 (2009).
Shu, J., et al., "Structurally Stable Pd-Ag Alloy Membranes: Introduction of a Diffusion Barrier," *Thin Solid Films*, 286:72-79 (1996).
Subramanian, P.R. and Laughlin, D.E., "Cu-Pd (copper-palladium)," *J. Phase Equilib.*, 12(2): 231-243 (1991).
Thoen, P.M., et al., "High flux palladium-copper composite membranes for hydrogen separations," *Desalination*, 193: 224-229 (2006).
U.S. Appl. No. 10/804,848: Notice of Allowance dated Sep. 21, 2006.
U.S. Appl. No. 10/896,743: Final Office Action dated Dec. 4, 2008.

(56) References Cited

OTHER PUBLICATIONS

U.S. Appl. No. 10/836,088 Final Office Action dated Nov. 22, 2006.
U.S. Appl. No. 10/804,846: Final Office Action dated Feb. 24, 2006.
U.S. Appl. No. 10/804,846: Notice of Allowance dated Sep. 26, 2006.
U.S. Appl. No. 10/804,846: Office Action dated Jun. 19, 2006.
U.S. Appl. No. 10/804,846: Office Action dated Oct. 20, 2005.
U.S. Appl. No. 10/804,847: Notice of Allowance dated Feb. 20, 2008.
U.S. Appl. No. 10/804,847: Office Action dated Sep. 20, 2006.
U.S. Appl. No. 10/804,848: Office Action dated May 5, 2006.
U.S. Appl. No. 10/836,088: Notice of Allowance dated Apr. 11, 2007.
U.S. Appl. No. 10/836,088: Office Action dated May 19, 2006.
U.S. Appl. No. 10/896,743: Final Office Action dated May 29, 2008.
U.S. Appl. No. 10/896,743: Notice of Allowance dated Jan. 26, 2010.
U.S. Appl. No. 10/896,743: Office Action dated Aug. 8, 2007.
U.S. Appl. No. 10/896,743: Office Action dated Jun. 18, 2009.
Uemiya, S., et al., "Separation of hydrogen through palladium thin film supported on a porous glass tube," *J. Membr. Sci.*, 56: 303-313 (1991).
Zhang X., et al., "Hydrogen transport through thin palladium-copper alloy composite membranes at low temperatures," *Thin Solid Films*, 516: 1849-1856 (2008).
Patent abstract of Japan, vol. 017, No. 400 (C-1089), (JP 05 076738 A, Mar. 30, 1993) (Jul. 27, 1993).
Patent abstract of Japan, vol. 010, No. 335 (C-384), (JP 61-138516 A, Jun. 26, 1986) (Nov. 13, 1993).
Database WPI, Derwent Publications Ltd., AN 84188007, XP 002097090 (SU 1 058 587 A, Dec. 7, 1983).
Database JAPIO, Japan Patent Information Organization, AN 92-326931 (JP 04-326931, Nov. 16, 1992).
U.S. Appl. No. 12/594,415: Office Action dated Mar. 12, 2012.

* cited by examiner

U.S. 8,652,239 B2

HIGH PERMEANCE SULFUR TOLERANT PD/CU ALLOY MEMBRANES

RELATED APPLICATION

This application claims the benefit of U.S. Provisional Application No. 61/330,511, filed on May 3, 2010.

The entire teachings of the above application are incorporated herein by reference.

GOVERNMENT SUPPORT

This invention was made with government support under grants DE-FC26-07NT43058 and DE-FG26-04NT42194 awarded by the U.S. Department of Energy. The government has certain rights in the invention.

BACKGROUND OF THE INVENTION

The recent international concern regarding the climate change has prompted carbon cap and trade agreements and sparked interest in emission free energy productions. In addition to its many uses in the chemical and petrochemical industries, hydrogen has the potential of being a sustainable "emissions free" energy carrier. Steam reforming and coal gasification, which are already common industrial processes, can be coupled with $CO_2$ capture and sequestration as a means of producing hydrogen on an industrial scale with limited carbon emissions.

Palladium membrane reactors are especially suited for catalytic membrane reactors as the reaction and separation steps are combined while producing high purity hydrogen gas on the permeate side of the membrane and pressurized $CO_2$ on the retentate side, lessening the amount of energy required for carbon capture. Separating hydrogen gas from $CO_2$ and other reforming by-products is currently done by pressure swing adsorption (PSA), but membrane reactors equipped with hydrogen selective Pd membranes have the potential to produce high purity hydrogen gas at lower temperatures by extracting the $H_2$ simultaneously with $H_2$ production, thus greatly reducing the energy expended in reaching a high conversion.

Composite Pd and Pd alloy membranes deposited on porous metal supports reduce the amount of Pd needed for separation, thus increasing the $H_2$ permeance and profitability, and have both the strength and structural integrity needed to withstand the large pressure differences needed on the industrial scale. Depositing the Pd with the electroless deposition method yields a hard film which uniformly covers complex shapes, and is relatively easy to scale up. The good adhesion between the metal substrate and the hydrogen selective Pd or Pd alloy layer ensures that the membrane will not detach during operation and thermal cycling due to differences in coefficients of thermal expansion or lattice expansion in a hydrogen atmosphere, as is prone to happen with ceramic supports, or porous metal supports which have been heavily modified with a layer of ceramic material.

However, small quantities of $H_2S$ present in the gas stream poison Pd membranes causing either a drastic reduction of the hydrogen permeance or irreparable damage to the membrane by forming a $Pd_4S$ layer. Pd/Cu alloys have generated much research, not only because they do not exhibit hydrogen embrittlement even at room temperature but also because Pd/Cu alloys are more resistant to $H_2S$ poisoning than pure Pd when the Cu composition is in the fcc region of the Pd/Cu phase diagram. FIG. 1 is a Pd—Cu phase diagram overlaid with the relative permeability of Pd/Cu membranes to Pd membranes as a function of Cu content at 350° C. One of the disadvantages of fcc Pd/Cu membranes is their low permeance in comparison to Pd and other Pd alloys due to the decreased solubility of $H_2$ in Pd/Cu alloys. The addition of only 10 and 30 wt % Cu decreased the permeance of Pd membranes, respectively by 35% and 85% at 350° C. See U.S. Pat. No. 3,247,648. An even larger decrease was seen at 540° C. with the permeance decreasing by 20 and 40% at concentrations of merely 5 and 10 wt % Cu respectively. Grashoff, G. J. et al., The purification of hydrogen: A review of the technology emphasizing the current status of palladium membrane diffusion, Platinum Met. Rev. 27 (1983) 157, the relevant teachings of which are incorporated herein by reference in their entirety.

The significant hydrogen permeance decrease seen in fcc Pd/Cu alloy membranes forces ultra-thin Pd/Cu membranes to be fabricated in order to achieve permeances which are comparable to pure Pd membranes or the more highly permeable Pd/Ag membranes. The relatively wide pore size distribution of porous metal supports makes reducing the Pd/Cu membrane thickness more difficult than with ceramic supports whose pore size distribution is more easily controlled. In addition, the selectivity and structural integrity of such ultra-thin Pd/Cu membranes is then more likely to deteriorate quickly.

In order to lessen the impact on the permeance by alloying Pd with Cu and while still retaining the sulfur resistance, Pd/Cu membranes with an fcc alloy only on the top layer have been fabricated and characterized by plating and annealing the bi-layers of Pd and Cu, thereby retaining the $H_2S$ resistance without as much of a decrease in the permeance as with a homogeneous Pd/Cu membrane of the same surface concentration.

In addition, recent high temperature x-ray diffraction (HT-XRD) studies of the annealing of Pd/Cu bi-layers disclosed that very long annealing times in $H_2$ were necessary to produce the fcc alloy on the surface and for the less resistant bcc phase to disappear. Less lengthy annealing times were achieved at temperatures as high as 600° C. but the exposure to such high temperatures would be damaging to membrane selectivity, even for short time periods.

Thus, there is a need in the art for an improved method of forming a membrane that alleviates the disadvantages described above. In particular, there is a need for a method of forming a membrane that is resistant to $H_2S$ poisoning while retaining a high $H_2$ permeance. In addition, there is a need for a method of forming such a membrane that can be annealed at lower temperatures and for shorter periods of time.

SUMMARY OF THE INVENTION

The present invention is directed to a method of making a membrane that includes the steps of forming a palladium layer, depositing a layer of copper on the palladium layer and galvanically displacing a portion of the copper with palladium. This present invention is also directed to membranes formed by the method.

The present invention has many advantages. For example, it is believed that membranes formed by the method have greater tolerance for sulfur. It is also believed that the membranes generally require lower annealing times and temperatures than a membrane having a surface Pd/Cu bi-layer. It is also believed that the membranes have a more uniform submicron layer disposition and will not sustain a significant loss of permeance due to $H_2S$ poisoning.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
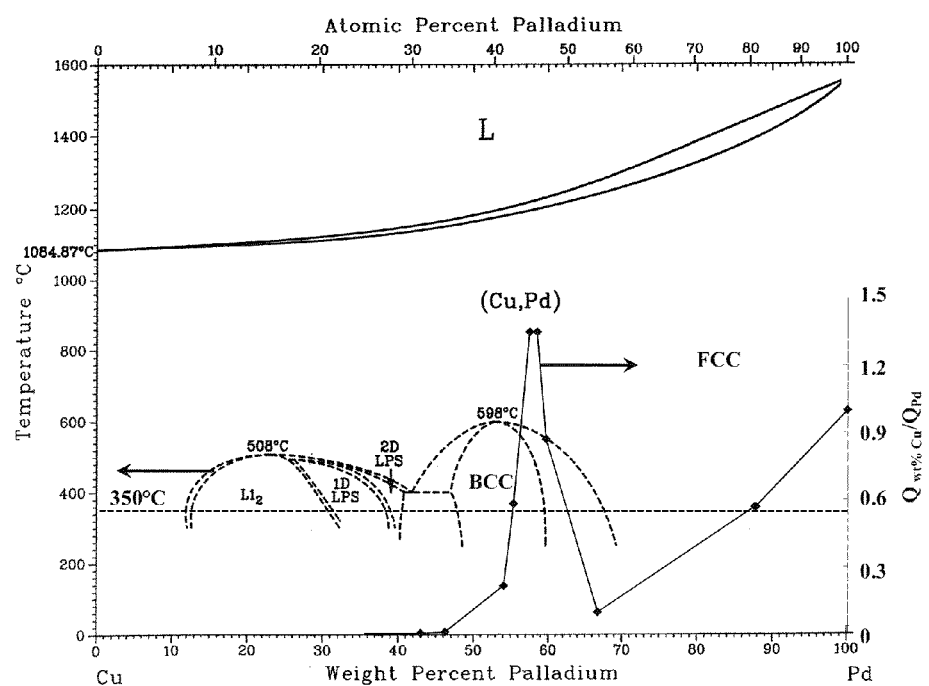
FIG. 1 is a Pd—Cu phase diagram overlaid with the relative permeability of Pd/Cu membranes to Pd membranes as a function of Cu content at 350° C.

A description of example embodiments of the invention follows.

The teachings of all patents, published applications and references cited herein are incorporated by reference in their entirety.

The following examples are intended to be illustrative, and are not intended to limit or define the invention.
Materials and Methods

Sample Preparation

Two types of supports were provided by Mott Metallurgical, Inc. (Farmington, Conn., USA). Coupons consisted of 316 L PSS (porous stainless steel) with a 0.5 μm media grade (dimensions: 1 cm×1 cm×0.1 cm and 5 cm×1 cm×0.1 cm). Tubular membrane supports consisted of a porous INCONEL 625 alloy with a 0.1 μm media grade (dimensions: length—6 cm, outer diameter—1.25 cm, thickness—0.16 cm). While these particular supports were used for the examples described herein, any porous metal and metal alloy support would be suitable. All supports were cleaned to remove impurities with an alkaline solution. The cleaned supports were oxidized at 700° C. for 12 hours in order to form an oxide intermetallic diffusion barrier between the support metals and the $H_2$ selective Pd alloy layer.

In order to block the larger pores of the tubular support before plating the dense Pd layer, the support was attached to a vacuum of 550 torr and immersed deionized water for five minutes followed by a $Al_2O_3$ slurry for 10 seconds. The vacuum was increased to 75 torr after the support was taken out of the slurry. While still at a high vacuum of 75 torr, the support was immersed in deionized water for 5 minutes and dried. To seal the slurry within the pores of the support, the support was activated once (one activation loop) under a vacuum of 550 torr and plated with Pd for 10 minutes.

A porous Pd/Ag barrier was deposited which further bridged the larger pores of the support and also functioned as an additional intermetallic diffusion barrier between the support metals and the hydrogen selective layer. After three activation loops, Pd was plated for 30 minutes, Ag for 60 minutes, Pd for 60 minutes, Ag for 60 minutes and finally Pd for 60 minutes. The resultant Pd/Ag barrier layer was lightly sanded with 2400 grit SiC paper and cleaned.

The activation sequence consisted of sequentially immersing the supports in an $SnCl_2$ solution for 5 minutes (e.g., about 1 g/L aqueous $SnCl_2$), deionized water for 2 minutes, fresh deionized water for 3 minutes, the $PdCl_2$ solution for 5 minutes (e.g., about 0.1 g/L aqueous $PdCl_2$), 0.01 M HCl for 2 minutes, and then fresh deioninzed water for 3 minutes. The sequence was repeated until a uniform brownish layer appeared, usually after 3-6 activation cycles. The procedure for surface activation is more fully described in U.S. Pat. No. 7,172,644, the relevant teachings of which are incorporated herein by reference in their entirety.

Once thoroughly activated, the supports were plated with a bi-layer of Pd and Cu. The Pd/Cu bi-layer was fabricated by electroless plating a layer of Pd followed by electroless plating a layer of Cu. The deposited layers were then annealed in $H_2$ at 500° C.

To form the Pd/Cu/Pd tri-layer, the displacement of the Cu layer with Pd was carried out with a $PdCl_2$ activation solution in dilute HCl. The compositions of plating and displacement baths used in this work are listed in Table 1. The volume/area ratio between the plating and displacement solutions and the plated area was kept between 3.9-4.3 cm.

Membrane Permeation Testing

The membranes were tested in a shell and tube apparatus encased in a furnace. The permeation setup consisted of a Watlow ceramic tube furnace and a 316 L SS shell casing. Hydrogen or helium flow to the membrane was controlled with a pressure regulator. A ballast volume of 500 mL was used to ease the transition between $H_2$ and He gases. The helium sweep was a low-pressure line on the tube side, which prevented the membrane from oxidizing during start-up/shutdown conditions and flushed the permeate side of the membrane during the transition between a $H_2$ atmosphere to a helium atmosphere. The helium sweep was not used during permeation experiments. Pressure gages were attached to the permeate and feed lines to measure the transmembrane pressure. Omega Type K thermocouples monitored the temperature of the permeate flow inside the tube and the temperature between the shell casing and the furnace. The helium leak rates of the membranes were measured at a pressure difference of $\Delta P=1$ bar, and the ideal $H_2$/He separation factors were calculated according to the ratio of $H_2$ to He fluxes through the membrane at a pressure difference of 1 bar.

Sample Characterization

The surface and cross-sectional characterizations were conducted with an Amray (Drogheda, County Louth, Ireland) 1610 Turbo scanning electron microscope (SEM) equipped with a Princeton Gamma-Tech (Princeton, N.J., USA) Avalon energy dispersive X-ray (EDX) light element detector and a RBA-1610 5MC type Robinson retractable backscattered electron detector for qualitative and quantitative elemental analysis. A JEOL 840 (Peabody, Mass., USA) SEM equipped with both Secondary Electron Imaging (SEI) and Backscattered Electron Imaging (BEI) was also employed for surface and cross sectional characterizations. The chemical analysis on the JEOL 840 SEM was conducted with a Kevex (now Thermo Kevex X-Ray Inc., Scotts Valley, Calif., USA) EDX Spectroscopy system. The spatial resolution for SEM-EDX lay between 0.8-1.2 μm and the penetration depth was about 1 μm for the samples investigated.

The phase identification analysis of coupons was performed with a Rigaku (The Woodlands, Tex., USA; Tokyo, Japan) Geigerflex X-Ray diffractometer (XRD) equipped with a $CuK_\alpha$ radiation source ($\lambda=1.54$ Å), and a curved crystal monochromator. The XRD data were analyzed with the software JADE 8.1 (Materials Data, Inc., Livermore, Calif., USA). The phase weight percentages were calculated by the direct comparison method. The direct comparison method calculates the amount of a phase present from the ratio of its intensity to the intensities of other phases present using constants pertaining to the diffractometer and the crystal structures present.

Plating/Displacement Bath Analysis

The determination of Pd and Cu concentration in the plating and displacement solutions was carried out with the Perkin Elmer (Waltham, Mass., USA) AAnalyst 300 Spectrometer equipped with a six lamp turret for either hollow cathode lamps (HCL) or electrode discharge lamps (EDL), HGA-850 Graphite Furnace System and AS800 Autosampler. An air/acetylene mixture was used as fuel for the flame. AA Winlabs Software (Perkin Elmer, Waltham, Mass., USA) was used to run and calibrate the spectrometer. HCL lamps were employed in both the Cu and Pd detection. For Cu detection, a slit width of 0.7 nm, a wavelength of 324.8 nm, and a lamp current of 15 V were used. For Pd detection, a slit width of 0.2 nm, a wavelength of 244.8 nm, and a lamp current of 30 V were utilized.

Results and Discussion

EXAMPLE 1

Dense Pd Layer Formation (Tubular Membrane Only)

Pd was plated until no plating solution was found in the interior of the tube indicating that the membrane was "liquid dense," usually after 2-3 plating rounds. The membrane would then be rinsed with deionized water and dried at 120° C. overnight. The He permeance would be measured and the membrane plated again. After the membrane was liquid dense, the membrane was plated with a vacuum by attaching the tube side to an aspirator or vacuum pump. A slight vacuum was used at first (550 torr) and if the level of the plating solution did not decrease, indicating that the membrane was "liquid dense", the vacuum was increased to 380 torr. If the membrane was "liquid dense" at 380 torr then the vacuum was then increased to 75 torr to block the remaining pinholes. Between each round of plating, the membrane was dried and the He permeance measured. If the He leak of the membrane could not be detected at $\Delta P=2.3$ bar at room temperature, the membrane was deemed dense.

EXAMPLE 2

Cu Plating

In order to form a Pd/Cu bi-layer, a plating bath was used to plate Cu onto the coupons. Table 1 lists the Cu plating bath composition, as well as the composition of the Pd galvanic displacement bath, which is described in greater detail below.

TABLE 1

Plating and galvanic displacement bath compositions and conditions

| | Pd bath | Standard Cu bath | Dilute Cu bath | Pd galvanic displacement bath |
|---|---|---|---|---|
| $Pd(NH_3)_4Cl_2 \cdot H_2O$ (g/l) | 4 | | | |
| $CuSO_4 \cdot 5H_2O$ (g/l) | | 25 | 2.5 | |
| $PdCl_2$ (g/l) | | | | 1.0 |
| $Na_2EDTA \cdot 2H_2O$ (g/l) | 40.1 | 47.5 | 4.75 | |
| $NH_4OH$ (28%) (ml/l) | 198 | | | |
| $H_2NNH_2$ (98%) (ml/l) | 0.19 | | | |
| $H_2CO$ (37%) (ml/l) | | 25 | 2.5 | |
| EDA (ppm) | | 112 | 11.2 | |
| $K_4Fe(CN)_6 \cdot 3H_2O$ (ppm) | | 35 | 3.5 | |
| $(C_2H_5)_2NCS_2Na \cdot 3H_2O$ (ppm) | | 5 | 0.5 | |
| pH | 10-11 | 12.0 | 12.7 | 2 |
| Temperature (° C.) | 60 | 20-25 | 20-25 | 20-25 |

After the Cu plating solution was prepared and the pH adjusted by adding concentrated NaOH or KOH solution, the activated support was immersed for 10-60 minutes at room temperature, depending on the desired thickness. After plating Cu, the supports were immediately immersed in 0.01 M HCl to neutralize any residual plating solution followed by rinsing with deionized water and ethanol to facilitate drying in order to prevent oxidation of the Cu layer.

The Standard Cu plating bath had a high plating rate and yielded a uniform deposition morphology, but required a high Cu concentration and the deposition rate was unpredictable. For the purpose of plating thin Cu layers on Pd membranes, a Dilute Cu bath was used with one tenth the concentration of the Standard Cu bath and an increase in the pH from 12.0 to 12.7 as shown in Table 1. In addition, a more dilute solution reduces the cost of the plating bath and the price of disposing of unused chemicals.

Figure 2:
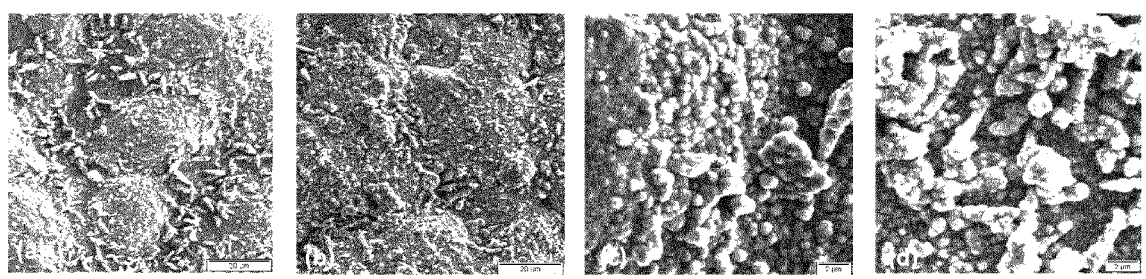
FIG. 2 is a secondary electron imaging (SEI) surface micrograph at 1000× of the samples plated with (a) the Standard Cu bath and (b) the Dilute Cu bath and at 5000× of the samples plated with (c) the Standard Cu bath and (d) the Dilute Cu bath.

FIG. 2 is a secondary electron imaging (SEI) surface micrograph at 1000× of the coupon samples plated with (a) the Standard Cu bath and (b) the Dilute Cu bath and at 5000× of the samples plated with (c) the Standard Cu bath and (d) the Dilute Cu bath.

FIG. 2 shows the deposition morphology of oxidized coupons plated with both the standard and dilute Cu baths. For each of the images, the plating bath was not agitated. The gravimetric thickness estimates of the Cu layers were 1.2 μm for plating with the Standard Cu bath (FIGS. 2a and 2c) and 0.9 μm for plating with the Dilute Cu bath (FIGS. 2b and 2d). The thicknesses of both layers was similar and, as the micrographs show, there was little difference between the morphologies of the two depositions. As FIGS. 2a and 2b show, both the Standard and Dilute Cu plating baths completely covered the oxidized surface, both on the surface of the porous support and inside the pores. The increased magnification in FIGS. 2c and 2d shows that the cluster size of Cu deposits were roughly the same for both specimen, and that the cluster size varied between 0.5-1 μm in diameter.

However, the plating rate (estimated by the average gravimetric weight gain of the plated samples) was much higher for the standard Cu bath. The plating rate for the standard Cu bath was roughly 3 μm/h while the plating rate for the dilute Cu bath was roughly 0.5 μm/h.

Figure 3:
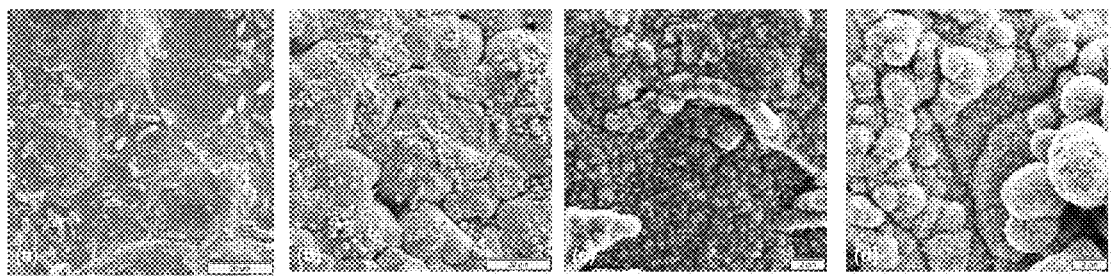
FIG. 3 is a secondary electron imaging (SEI) surface micrograph at 1000× of the coupon samples plated with the Dilute Cu bath with an agitation speed of (a) 200 rpm and (b) 400 rpm and at 5000× at (c) 200 rpm and (d) 400 rpm.

FIG. 3 is a secondary electron imaging (SEI) surface micrograph at 1000× of the coupon samples plated with the Dilute Cu bath with an agitation speed of (a) 200 rpm and (b) 400 rpm and at 5000× at (c) 200 rpm and (d) 400 rpm. The thickness of the deposit when agitated at 200 and 400 rpm was 1.2 μm and 1.7 μm, respectively. In comparison to the Cu deposit which was plated without bath agitation (FIG. 2), the thin layers resulting from agitated plating baths (FIG. 3) were more uniform and consisted of very fine, evenly dispersed clusters. Plating without agitation resulted in clusters that were both large and small, thus yielding a less uniform surface. The Cu layer thickness of the sample plated with the unagitated bath varied more than with the agitated bath.

FIGS. 3c and 3d show that the cluster size was reduced to the order of hundreds of nanometers with an agitation speed of 200 rpm, and that agitation at 400 rpm reduced the cluster size even further. Without being bound to any particular theory, stirring the plating bath reduced the mass transfer resistance caused by the diffusion of the $Cu^{2+}$ ions to the plated surface, allowing more Cu nuclei to attach to the oxidized PSS and finer grains to form. Increasing the agitation speed higher than 400 rpm yielded no change in the cluster size or deposit morphology.

It should be noted that at agitation speeds of 400 rpm and above, the activation layer was dried for two hours at 120° C. prior to plating. While it was possible to plate directly after activation at agitation speeds below 400 rpm, the higher agitation speeds appeared to have removed the activation layer from the coupons preventing the plating reaction from initiating, even after 60 minutes. Furthermore, the samples plated with stirring rates of 400 rpm or higher were first plated without stirring for 30 seconds before increasing the stirring rate to 200 rpm for 30 seconds and then continuing at speeds of 400 rpm or higher.

Thus, the Dilute Cu plating bath yielded better plating results than the Standard Cu plating bath. No reduction in $Cu^{2+}$ ion concentration was observed in the 100 mM Cu plating bath after two hours of plating and subsequently no increase in conversion, due to the small amount of Cu being depleted relative to the overall concentration of Cu in the bath.

Figure 4:
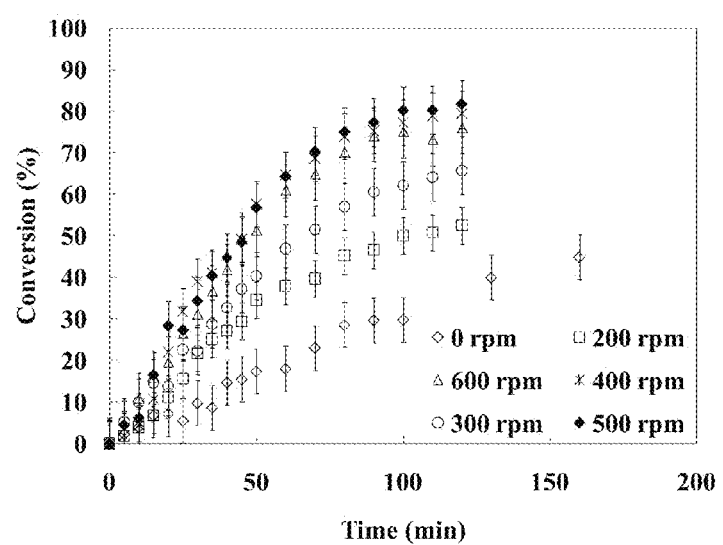
FIG. 4 is a graph of the conversion percentage as a function of time for the Dilute Cu bath at various agitation speeds.

FIG. 4 is a graph of the conversion percentage as a function of time for the Dilute Cu bath at various agitation speeds. Conversion percentage was calculated based on the decrease in the concentration of $Cu^{2+}$ ion in the bath. As the Cu deposited on the samples, the $Cu^{2+}$ ion concentration in the bath was depleted and the conversion increased. For the first hour of plating, the increase in conversion was linear for all agitation speeds. During the second hour, the increase in conversion slowed down in the unagitated bath, but the Cu continued to deposit on the sample. For the agitated baths, the deposition rates decreased significantly during the second hour until little change could be seen after 100 minutes. The conversion of the bath stirred at 200 rpm was higher than that of the unagitated bath after two hours, at 50% and 40% respectively. The conversion after two hours increased to 60% at 300 rpm and to roughly 80% at 400, 500, and 600 rpm, showing a more efficient use of the plating bath.

Figure 5:
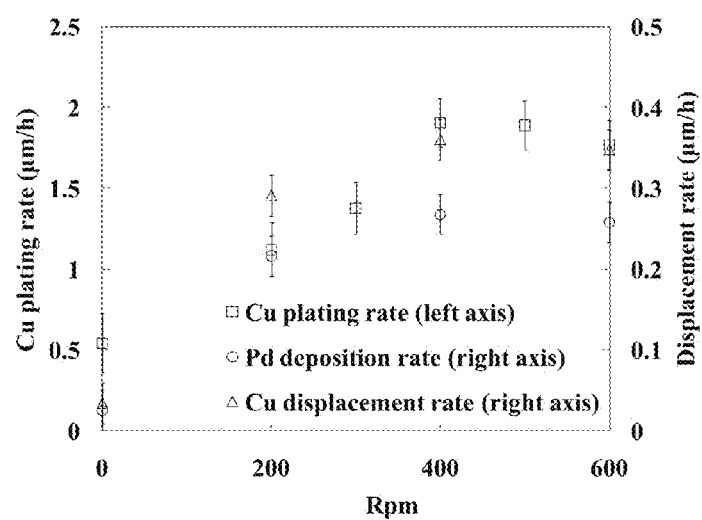
FIG. 5 is a graph of the linear deposition rates as a function of the plating bath agitation speed. The Cu plating rates were determined from measurements during the first 60 minutes. The Pd and Cu displacements rates were determined from measurements during the first 30 minutes.

FIG. 5 is a graph of the linear deposition rates as a function of the plating bath agitation speed. The Cu plating rates were determined from measurements during the first 60 minutes. The Pd and Cu displacements rates were determined from measurements during the first 30 minutes. The Cu plating rates of FIG. 5 were calculated from the linear portion of the plots in FIG. 4. The unagitated bath yielded a Cu plating rate of roughly 0.5 μm/h. The Cu plating rate increased with agitation speed until 400 rpm at roughly 1.75 μm/h. No appreciable change in the plating rate was observed upon further increase of the bath agitation speed. Without being bound to any particular theory, the increase in the plating rate seen at lower agitation speeds was due to the bath agitation decreasing the effects of the diffusional mass transfer resistance within the plating solution. At 400 rpm the effect of diffusion was minimized by stirring and the plating rates observed at 400, 500 and 600 rpm were equal to the actual rate of reaction of the Cu deposition. The uniform deposition observed coupled with the high plating rate made a bath agitation rate of 400 rpm the optimum condition for plating membranes.

EXAMPLE 3

Galvanic Displacement of Cu by Pd

In order to form the Pd/Cu/Pd tri-layer, a galvanic displacement step was performed. During the galvanic displacement step, Pd is deposited while Cu is displaced. The samples were first plated with roughly 1.5 μm of Cu. In order to conduct the galvanic displacement, the samples were immersed in a $PdCl_2$ solution that was agitated at varying speeds for 1.5 hours. The composition of the Pd galvanic displacement bath is described in Table 1. The galvanic displacement of Cu occurs according to the following electrochemical reaction where the $Pd^{2+}$ ion in solution replaces the Cu metal on the substrate:

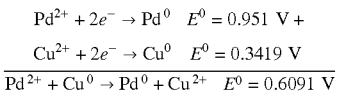

$$\frac{\begin{array}{l}Pd^{2+} + 2e^- \rightarrow Pd^0 \quad E^0 = 0.951 \text{ V} +\\ Cu^{2+} + 2e^- \rightarrow Cu^0 \quad E^0 = 0.3419 \text{ V}\end{array}}{Pd^{2+} + Cu^0 \rightarrow Pd^0 + Cu^{2+} \quad E^0 = 0.6091 \text{ V}}$$

Figure 6:
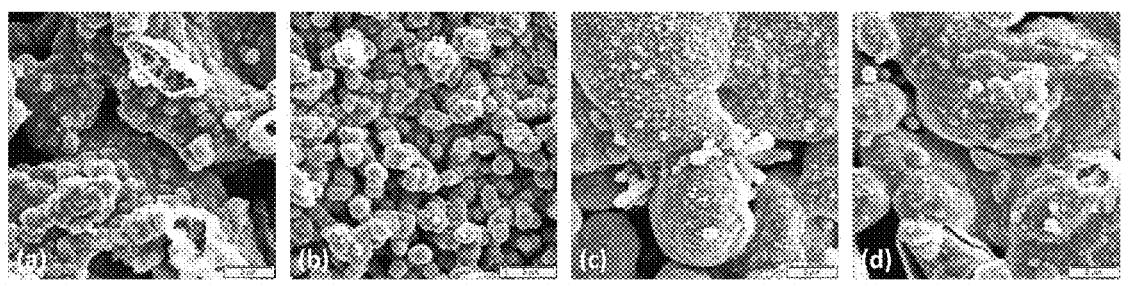
FIG. 6 is a secondary electron imaging (SEI) surface micrograph at 3000× of samples plated with Cu and further displaced by Pd with (a) an unagitated bath, and with a bath agitated at speeds of (b) 200 rpm, (c) 400 rpm, and (d) 600 rpm.

FIG. 6 is a secondary electron imaging (SEI) surface micrograph at 3000× of samples plated with Cu and further displaced by Pd with (a) an unagitated bath, and with a bath agitated at speeds of (b) 200 rpm, (c) 400 rpm, and (d) 600 rpm. For the images shown in FIG. 6, the samples were also agitated during Cu deposit. As shown in FIG. 6, the morphology of the surface resulting from the unagitated bath yielded cluster sizes of roughly 1-3 μm in diameter. Increasing the agitation speed to 200 rpm resulted in no change in cluster size, but at 400 and 600 rpm the cluster sizes which were much smaller (less than 1 μm in diameter). In addition, the Pd deposition at 400 and 600 rpm was more uniform and covered the majority of the surface with the same amount of Pd whereas in the unagitated bath and the bath agitated at 200 rpm (FIGS. 6a and 6b) the Pd was deposited in the vertical direction with clusters forming on top of one another. The result is that the unagitated bath yielded a less uniform surface coverage. Without being bound to any particular theory, bath agitation speeds of 400 rpm and above minimized the effect of diffusional mass transfer resistance within the solution, similar to the results demonstrated for Cu deposition. At bath agitation speeds of 400 rpm and above, Pd displacement to occurs at more sites and yields a more evenly dispersed layer of clusters that are smaller in size than the clusters resulting from the unagitated bath and the bath agitated at a rate of 200 rpm.

Figure 7:
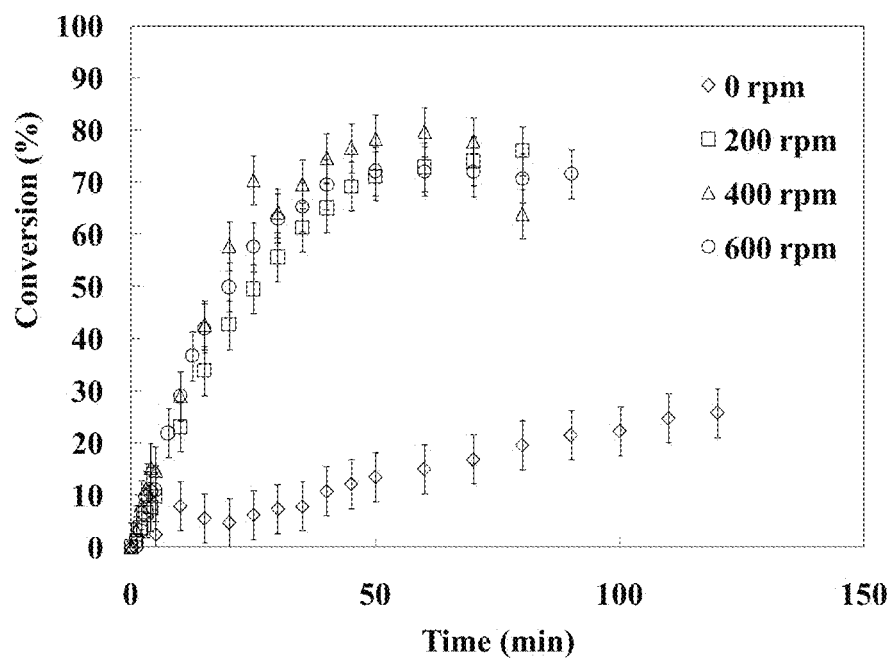
FIG. 7 is a graph of the conversion percentage as a function of time for the Pd galvanic displacement bath at various agitation speeds.

FIG. 7 is a graph of the conversion percentage as a function of time for the Pd galvanic displacement bath at various agitation speeds. The conversion of the unagitated bath increased linearly, and even after two hours, the reaction showed no signs of slowing down as only a small portion of the $Pd^{2+}$ ions in the solution was depleted. Conversion percentage was calculated based on the decrease in the concentration of $Pd^{2+}$ ion in the bath. However, the conversion increased rapidly when the bath was agitated at 200, 400, and 600 rpm. The increase proceeded in a linear fashion for the first 30 minutes and slowed down until after one hour when the reaction had completed. More Pd had deposited on the samples immersed in the agitated bath, as observed with the EDS scans (not shown) performed on the sample surfaces seen in FIG. 6. Between 45-50 wt % Pd was observed on the surface of the samples with bath agitation speeds of 200, 400 and 600 rpm. Only 20 wt % Pd was detected on the sample from the unagitated bath. While the unagitated bath reached a conversion of only 25% after two hours, the agitated baths all reached conversions of roughly 80% after one hour due to the minimization of the diffusional mass transfer resistance within the solution resulting in an increased deposition rate.

FIG. 5 shows the Pd deposition rate for the linear portion of FIG. 7 as a function of agitation speed. The deposition rate was determined by measuring the $Pd^{2+}$ ion concentration in the bath as a function of time. While the deposition rate of the Pd was very slow with the unagitated bath, stirring increased the rate dramatically at 200 rpm. Increasing the agitation rate to 400 rpm resulted in a slight increase in deposition rate but no further increase in the deposition rate was observed at 600 rpm showing that the deposition rates observed at 400 and 600 rpm were indeed equal to the reaction rate.

EXAMPLE 4

X-ray Diffraction Analysis of Annealed Samples

A coupon with a Pd/Cu/Pd tri-layer was fabricated as described above. In order to obtain both a high deposition rate and uniform surface coverage with small cluster sizes, bath agitation rates of 400 rpm for both the Cu plating and the Pd plating (galvanic displacement of Cu) baths were used. The first layer of Pd had a gravimetrically-determined thickness of 8.0 μm. A 0.5 μm layer of Cu was deposited on the Pd during 15 minutes of plating. The thickness of the Cu layer was determined gravimetrically. The sample was then immersed in the galvanic displacement bath for 60 minutes, yielding a calculated deposition of 0.15 μm of Pd and 0.12 μm of Cu displaced.

The samples were annealed by placing them in a furnace in which He was circulated on both the shell and tube sides of the membrane to prevent oxidation. The temperature was increased at a rate of 5° C./min until reaching 300° C. The He flow was replaced with $H_2$ flow and the temperature was increased at a rate of 5° C./min until reaching the desired temperature, which was then held for the desired period of time. The temperature was then decreased at the 5° C./min to 300° C., at which point the $H_2$ was replaced with He and the system brought down to room temperature.

Figure 8:
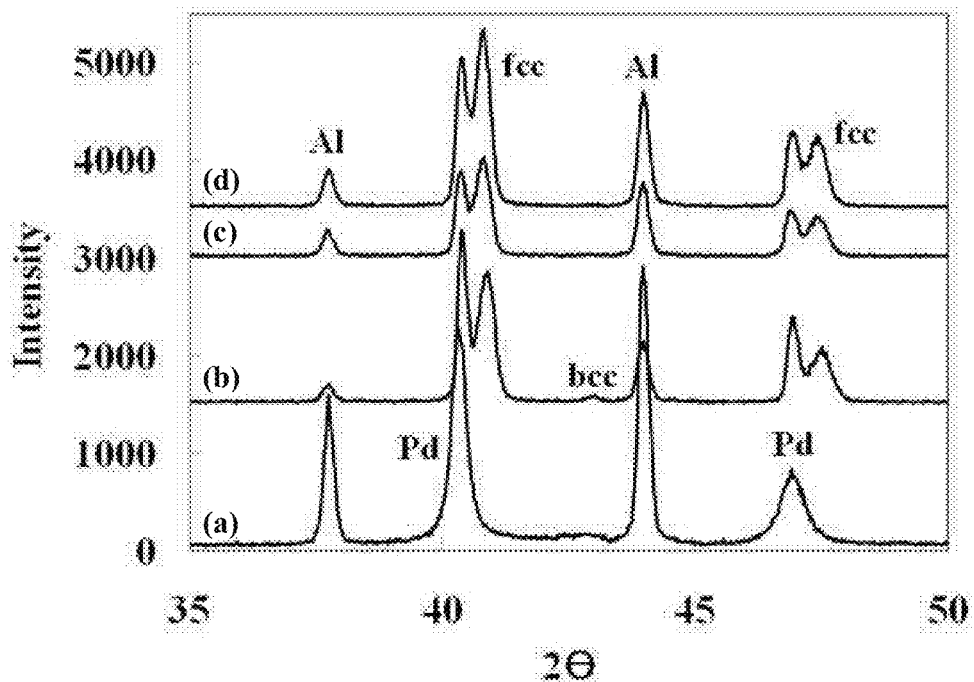
FIG. 8 is an x-ray diffraction (XRD) scan of the coupon (a) before and after annealing in $H_2$ at 450° C. for (b) 24 hours, (c) 36 hours, and (d) 144 hours.

FIG. 8 is an x-ray diffraction (XRD) scan of the Pd/Cu/Pd tri-layer coupon (a) before and after annealing in $H_2$ at 450° C. for (b) 24 hours, (c) 36 hours, and (d) 144 hours. Before annealing, the only peaks observed were for the aluminum sample holder and for Pd. The Cu peak would normally appear slightly to the left of the aluminum peak at 43.30° but the peak was not observed in the scan because the resultant Cu layer following the galvanic displacement was too thin to be detected by XRD. After annealing in $H_2$ at 450° C. for 24 hours (FIG. 8b), the Pd peak still remained and both the fcc and bcc Pd/Cu alloys were present at concentrations of 45 wt % and 2 wt % respectively with Pd as the balance.

Previous work showed that annealing a bi-layer of Pd/Cu yielded 2 wt % of the bcc phase after 7.5 hours of annealing at 600° C. in $H_2$, and only reached 10 wt % at 550° C. and 38 wt % at 500° C. after 25 and 50 hours of annealing in $H_2$, respectively. N. Pomerantz et al., Isothermal solid-state transformation kinetics applied to Pd/Cu alloy membrane fabrication, AIChE J., 56(12) 3062-3073 (2010), the relevant teachings of which are incorporated herein by reference in their entirety. However, annealing the Pd/Cu/Pd tri-layer described herein unexpectedly required a lower temperature and less time to results in an fcc Pd/Cu alloy. Thus, the present results show that a thin tri-layer of Pd/Cu/Pd formed the sulfur tolerant fcc phase much more quickly and at a lower temperature than the bi-layer. In addition, it was possible that no further annealing would be required in order for the fcc phase to be present on the surface. In contrast to an annealed Pd/Cu bi-layer, which would have the highest concentration of Cu on the surface, a tri-layer would have the highest concentration of Cu just below the surface of the sample. In the case of the tri-layer, a membrane could have the fcc phase on the surface even though the bcc phase would still be present within the layer. In the case of the bi-layer, the presence of the bcc phase would be on the surface of the membrane, resulting in a top layer which was not sulfur resistant.

Further annealing of the sample in $H_2$ at 450° C. for another 12 hours (FIG. 8c) resulted in the disappearance of the bcc phase. The XRD scans showed that the composition after a total annealing time of 36 hours was 43 wt % and 57 wt % for the Pd and fcc phases respectively. Further annealing in $H_2$ at 450° C. for a total of 144 hours (FIG. 8d) showed no change in the composition, thus showing that the fcc alloy remained near the surface. Continued diffusion into the Pd layer would require more thermal energy due to the decrease in the diffusion coefficient with increased Pd content and corresponding increase in Tamman temperature. For bi-layers of Pd/Cu, the complete disappearance of the bcc phase would take place after 225 hours in $H_2$ at 500° C., 42 hours at 550° C. and 10 hours at 600° C. Thus, the Pd/Cu/Pd tri-layer yielded the same sulfur resistant phase on the surface after just 36 hours of annealing at 450° C. in $H_2$.

Figure 9:
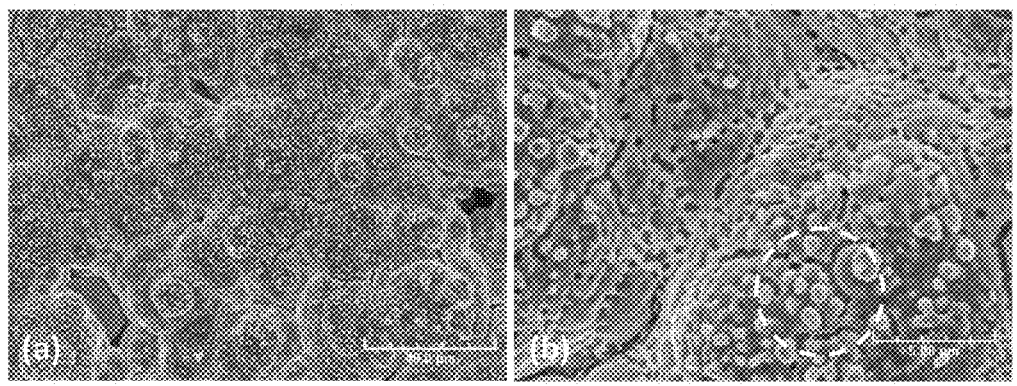
FIG. 9 is a secondary electron imaging (SEI) surface micrograph of an annealed Pd/Cu/Pd coupon at (a) 1000× and (b) 5000×.

FIG. 9 is a secondary electron imaging (SEI) surface micrograph of a Pd/Cu/Pd tri-layer coupon after annealing at 450° C. in $H_2$ for 144 hours at (a) 1000× and (b) 5000×. The numerous holes and bumps (circled in FIG. 9b) seen after the alloying of Pd and Cu were caused by the Kirkendall effect where the diffusivities of the two metals undergoing diffusion were unequal and the atoms of one element diffused faster than they could be replaced by the second element, leaving holes.

Figure 10:
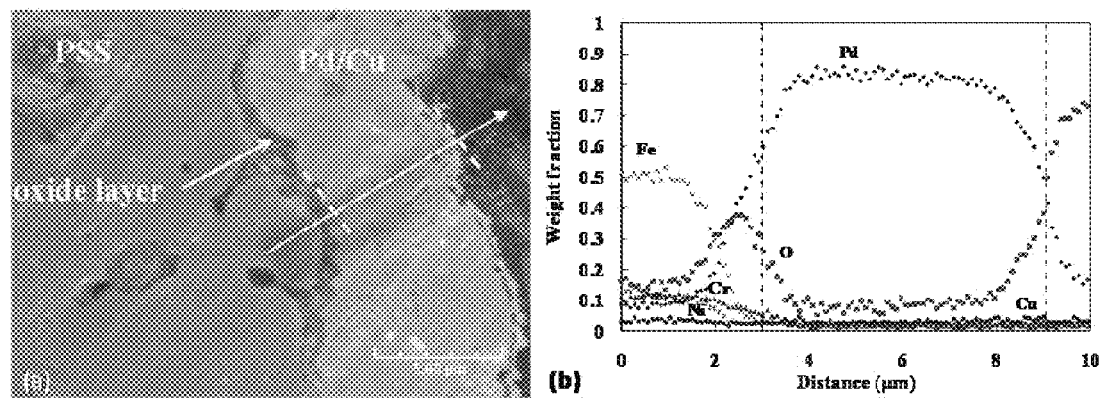
FIG. 10 is (a) the cross-sectional micrograph at 5000× and (b) corresponding elemental line scan of the Pd/Cu/Pd tri-layer coupon after annealing at 450° C. in $H_2$ for 144 hours.

FIG. 10 is (a) the cross-sectional micrograph at 5000× and (b) corresponding elemental line scan of the Pd/Cu/Pd tri-layer coupon after annealing at 450° C. in $H_2$ for 144 hours. Even though the presence of Cu was confirmed by the detection of the fcc alloy in FIG. 8, Cu could not be detected in the line scan in FIG. 10b. The Cu layer could not be detected because its layer thickness after Pd galvanic displacement was less than the resolution of the line scan (roughly 0.5 μm at 15 kV). Even though annealing at 450° C. thickened the layer in which the Cu was present as the Cu diffused into the Pd, the amount of Cu was insufficient to distinguish the signal from the background of the energy-dispersive x-ray spectroscopy (EDS) spectrum. However, the Cu could clearly be detected on the surface of the sample shown in FIG. 9. EDS area scans yielded Cu concentrations which varied between 5-10 wt % (EDS spectra not shown).

EXAMPLE 5

Pd/Cu Membrane Performance

In accordance with the findings in the previous sections, a Pd/Cu membrane of the invention (designated as M1) was prepared. A dense composite Pd membrane having a thickness of 18.6 μm was formed on an INCONEL 625 alloy tubular support. Cu was plated on the dense composite Pd membrane for 15 minutes using the Dilute Cu bath with a bath agitation speed of 400 rpm, followed by galvanic deposition of Pd through the displacement of Cu with a bath agitation speed of 400 rpm for 60 minutes. The plating bath compositions are as described in Table 1. The total gravimetric thickness estimates of the layers in the composite membrane are listed in Table 2. The gravimetric thickness of the Cu deposited by electroless plating was 0.4 μm.

TABLE 2

Summary of the Pd and Pd/Cu membrane fabrication and performance

| | Pd/Cu | | | Pd | | |
|---|---|---|---|---|---|---|
| | Membrane | | | | | |
| | M1 | M2a* | M3** | M2 | M4 | M5 |
| Pd glue (μm) | 1.6 | 0.2 | 3.3 | 0.2 | 1.1 | 1.6 |
| Pd/Ag barrier (μm) | 6.1 | 5.1 | 4.3 | 5.1 | 2.9 | 5.9 |
| Dense Pd (μm) | 11 | 7.4 | 7.9 | 7 | 7.7 | 5.2 |
| Dense Cu (μm) | 0.3 | 3.8 | 1.6 | 0 | 0 | 0 |
| Total (μm) | 19.0 | 16.5 | 17.1 | 12.3 | 11.7 | 12.7 |
| wt % Cu | 2 | 28 | 13 | 0 | 0 | 0 |
| $F_{450° C.}$ ($m^3/m^2*bar^{0.5}*h$) | 22.9 | 18 | 16.8 | 29.4 | 35.3 | 37.4 |
| $F_{foil, 450° C.}$ ($m^3/m^2*bar^{0.5}*h$) | 24.7 | 28.5 | 32.5 | 38.2 | 40.1 | 37.5 |
| Ea (kJ/mol) | 13 | 15 | 18.5 | 9.5 | 11.6 | 14.1 |
| % F of Pd foil | 93 | 63 | 52 | 77 | 88 | 100 |

*After the characterization, M2 was repaired with 0.6 μm of Pd and plated with 3.8 μm of Cu. The repaired Pd/Cu alloy membrane was referred to as M2a.
**The permeance and permeance foil data were taken at 500° C. for M3.

It should be noted that the deposit of dense Pd on the tubular support was smoother than the deposit of Pd on the coupons described in Examples 2 and 3, thus making the adhesion of the activated layer more problematic for the tubular supports at high bath agitation speeds and reducing the plating rate as measured by AAS. In order to improve the adhesion of the activated layer and obtain the same plating rates for the tubular supports as with the coupons described in Examples 2 and 3, the activation procedure was modified by immersing the tubular support in the $SnCl_2$ solution for 10 minutes, followed by deionized water, followed by immersing the support in the $PdCl_2$ solution for 30 minutes, followed by 0.01 M HCl and deionized water, and then drying the activated layer at 120° C. for two hours.

The total amount of Cu present in M1 was roughly 2 wt %, although the local concentration near the surface should be higher, according to the results of Example 4. The Pd that was deposited through displacement was included in the dense Pd thickness shown in Table 2.

Figure 11:
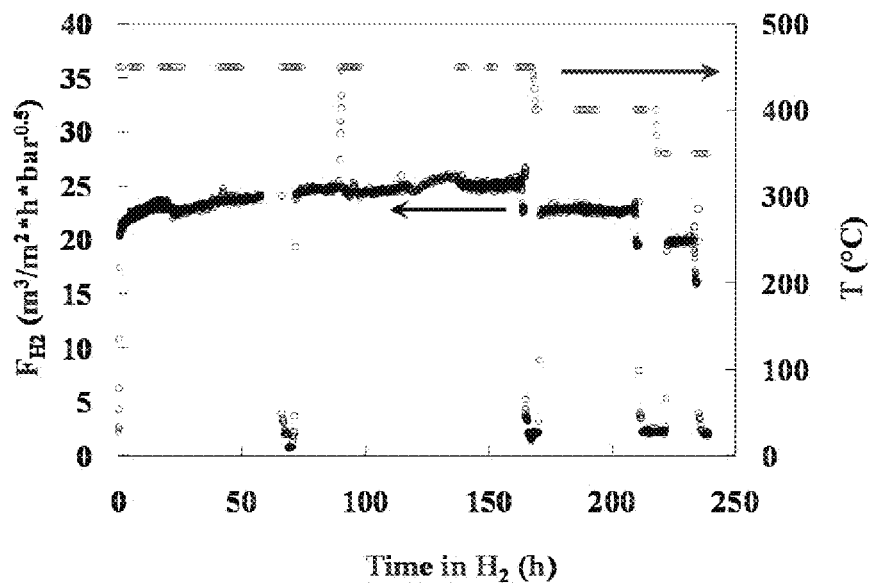
FIG. 11 is a graph of hydrogen permeance and temperature as a function of time for tubular membrane support M1.
Figure 12:
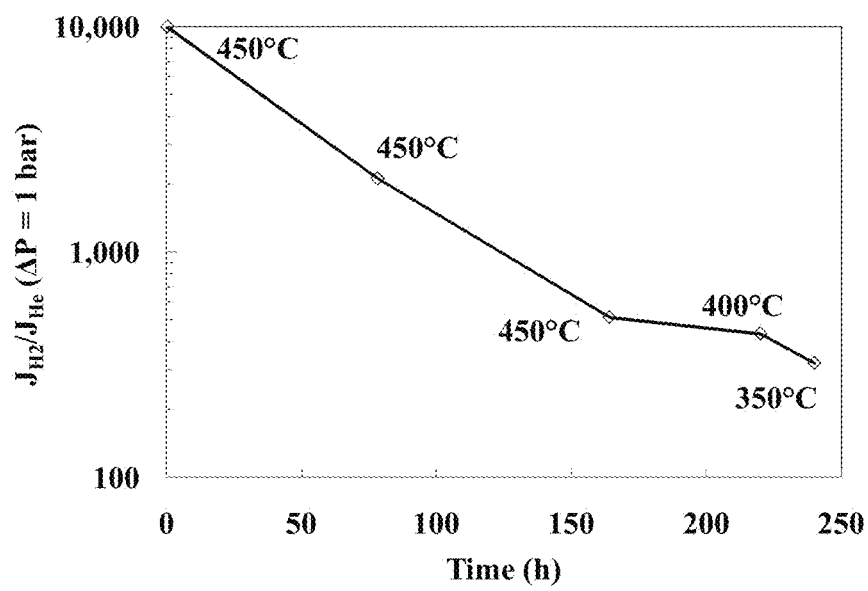
FIG. 12 is a graph of the ideal $H_2$/He separation factors as a function of time and temperature for tubular membrane support M1.

Before characterization, M1 was heated up to 450° C. in He. No He leak could be detected either at room temperature or 450° C., even at a pressure difference of 3 atm. FIG. 11 is a graph of hydrogen permeance and temperature as a function of time for tubular membrane support M1. Pure $H_2$ was fed to M1 for 150 hours during which the $H_2$ permeance remained stable, as seen in FIG. 11. According to the findings of Example 4, 36 hours in $H_2$ at 450° C. sufficed to form a top layer entirely in the fcc phase. FIG. 12 is a graph of the ideal $H_2$/He separation factors as a function of time and temperature for tubular membrane support M1. At 450° C., the ideal $H_2$/He separation factor decreased to 2110 after 75 hours and to 512 after 164 hours due to stress and grain coarsening, as shown in FIG. 12. The characterization was continued by decreasing the temperature to 400° C. and 350° C. At 400° C. and 350° C., the ideal $H_2$/He separation factor decreased to 443 and 321 respectively due to the decrease in $H_2$ permeance with temperature and increase in He permeance with the decrease in temperature as described by the dusty gas flow model.

Figure 13:
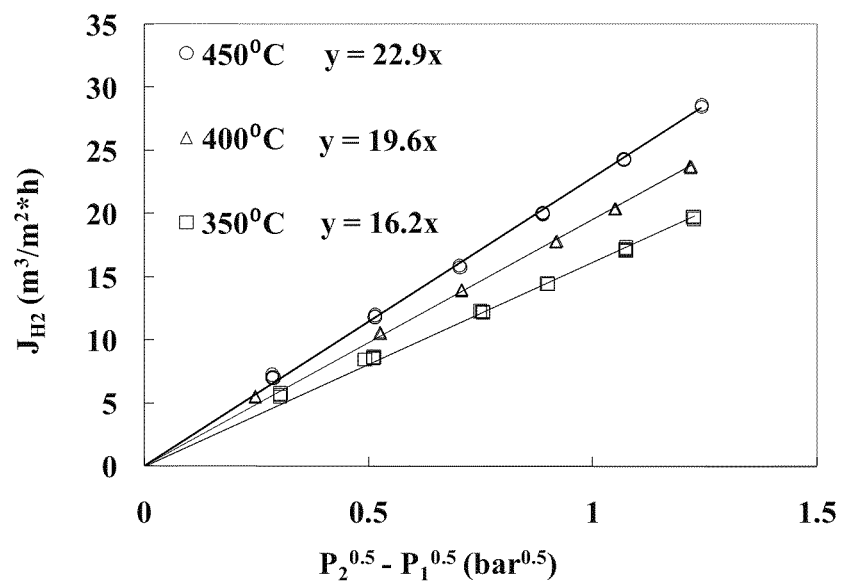
FIG. 13 is a Sievert's Law regression to calculate the hydrogen permeance of tubular membrane support M1.

FIG. 13 is a Sievert's Law regression, shown in Eq. (1), to calculate the hydrogen permeance of tubular membrane support M1 at each of the temperatures tested. The linearity of the plots show that the one dimensional diffusion of hydrogen through the Pd/Cu alloy layer was the rate limiting step for mass transfer through the composite membrane. The slopes of the lines were equal to the hydrogen permeance at each temperature.

$$J_{H_2} = F(P_2^{0.5} - P_1^{0.5}) \quad (1)$$

Table 2 shows a summary of the performance of membrane M1 of the invention compared to pure Pd membranes (M2, M4 and M5) and Pd/Cu bi-layer membranes (M2a and M3), all of which were fabricated with the same support modification of the $Al_2O_3$ slurry, Pd glue, Pd/Ag barrier, as described in Sample Preparation. Membranes M2a and M3 were Pd/Cu membranes fabricated in the same manner as M1 with the exception that the Cu plating bath for M2a and M3 was the Standard Cu bath and the fcc alloy was formed by annealing Pd/Cu bi-layers. The hydrogen permeances of M1, M2a and M3 as calculated according to Sieverts' Law at 450° C. are listed in Table 2 along with the hydrogen permeance of a pure Pd foil of the same thickness as each of the membranes at 450° C., as previously determined.

Although the total thickness of M1 was a few microns larger than the thicknesses of M2 and M3, the permeance of M1 at 450° C. was unexpectedly larger than the permeances of M2a and M3. Of even more importance, when comparing the measured membrane permeance to the theoretical permeance of a pure Pd foil of the same thickness as the Pd/Cu membranes, M1 performed similarly to the Pd membranes. Theoretical performance can be determined by calculating the hydrogen permeance of an unsupported pure Pd foil of the same gravimetric thickness, as given in the literature. The measured permeances of M2, M4 and M5 ranged between 80-100% of the theoretical permeance of pure Pd foils of the same thickness. The Pd/Cu membrane M1 had a permeance which was 93% of the theoretical permeance of a pure Pd foil, which was in the range of the performance of the pure Pd membranes made with the same method of support modification (e.g., oxidation, $Al_2O_3$ slurry, Pd/Ag intermetallic barrier, as described above). Bi-layer Pd/Cu membranes in the fcc phase (M2a and M3) had permeances which ranged between 50-60% of the permeance of Pd foils of the same thickness. Thus, membranes made according to the methods described herein provide permeances similar to a pure Pd membrane, even though they have a Pd/Cu alloy, which have been shown to reduce permeance. In other words, the disadvantage of decreased hydrogen permeance that accompanied the sulfur-tolerant fcc phases in Pd/Cu membranes was significantly reduced.

Figure 14:
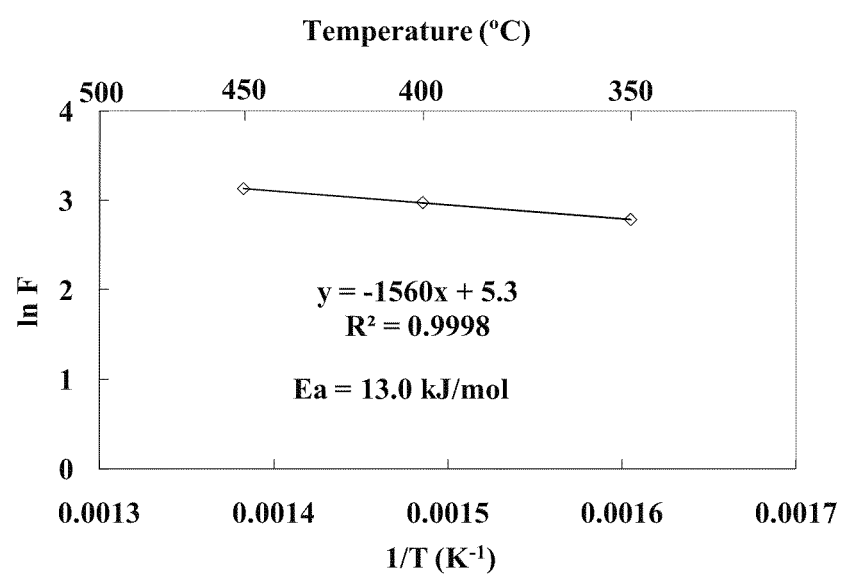
FIG. 14 is a graph showing the Arrhenius dependence of hydrogen permeance on temperature for tubular membrane support M1.

FIG. 14 is a graph showing the Arrhenius dependence of hydrogen permeance on temperature for tubular membrane support M1. The slope of the line yielded an activation energy of 13.0 kJ/mol. While the activation energy of permeation for the Pd/Cu membranes fabricated with a similar support modification to M1 ranged between 15-19 kJ/mol, as seen in Table 2, the activation energy of the Pd membranes fabricated with the same support modification ranged between 9-15 kJ/mol. The activation energy of the Pd/Cu membrane M1 fell in the range of Pd membranes, showing permeation properties which were characteristic of the Pd membranes rather than the Pd/Cu membranes.

The reduced Cu content of M1 clearly mitigated the effect of alloying Cu with Pd in the fcc phase. While the small Cu content near the membrane surface was enough to form the fcc phase as shown in Example 4, the permeation of the membrane was not affected, nor the activation energy, thus showing that a Pd/Cu membrane could be fabricated with the sulfur tolerant fcc phase without reducing the hydrogen permeance.

Although the thickness of M1 was 19.0 μm, the combined thickness of the top layers of the Cu and Pd were roughly 0.4 μm. Gas-tight Pd membranes thinner than M1 could also have the sub-micron layers deposited on the surface without reducing the overall hydrogen permeance. However, if the hydrogen selective layer would be very thin as is possible with ceramic supports, and the top alloy layer would become a larger fraction of the total membrane thickness, the overall permeance would be more significantly reduced by the presence of the surface alloy, but not as drastically as with the homogeneous fcc Pd/Cu alloy membranes presented in the literature.

Membrane M1 was tested at 450° C. in an atmosphere of 0.2 ppm $H_2S/H_2$. The hydrogen permeance decreased slowly for the first 12 hours and remained constant for another 12 hours at 75% of the original permeance, thus exhibiting the sulfur tolerance of the tri-layer membrane. Both the bi-layer and tri-layer membrane were poisoned with $H_2S$ concentrations ranging between 0.2-50 ppm and recovered in $H_2$. The total testing time lasted for as long as several thousand hours. All membranes suffered from a decrease in permeance which ranged from small (25% at 0.2 ppm) to more severe (80% at 50 ppm) with increased $H_2S$ concentration due to the dissociative chemisorption of $H_2S$ on the Pd/Cu surface. However, the permeance stabilized immediately upon introduction of the $H_2S$ and remained stable for the duration of the poisoning.

While the amount of permeance recovered in $H_2$ was the same for both bi-layer and tri-layer membranes at any given temperature, the permeance decline suffered by the bi-layer membranes was larger than that of the tri-layer membranes. Without being bound by any particular theory, one explanation could be that residual bcc phase patches on the bi-layer membrane surface had not completely annealed, and these bcc phases are not present on the tri-layer membrane.

The relevant teachings of all publications identified herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of making a membrane, comprising the steps of:
   a) forming a palladium layer;
   b) depositing a layer of copper on the palladium layer;
   c) galvanically displacing a portion of the copper with palladium; and
   d) annealing the layers of palladium and copper to form the membrane.

2. The method of claim 1, wherein the palladium layer is formed on porous stainless steel.

3. The method of claim 1, wherein the dense palladium layer is formed on a tubular support.

4. The method of claim 3, further including the step of cleaning the support with an alkaline solution prior to forming the palladium layer.

5. The method of claim 3, further including the step of oxidizing the support prior to forming the palladium layer.

6. The method of claim 5, wherein the support is oxidized at about 700° C.

7. The method of claim 6, wherein the support is oxidized for about 12 hours.

8. The method of claim 3, further including the step of grading the support.

9. The method of claim 8, wherein the support is graded with $Al_2O_3$.

10. The method of claim 8, further including the step of plating the support with a porous barrier.

11. The method of claim 10, wherein the porous barrier is a Pd/Ag barrier.

12. The method of claim 1, wherein the copper layer is deposited on the palladium layer by electroless deposition in a copper plating bath.

13. The method of claim 12, wherein the copper plating bath includes $CuSO_4.5H_2O$, $Na_2EDTA.2H_2O$, HCHO (37%), EDA, $K_4Fe(CN)_6.3H_2O$, and $(C_2H_5)_2NCS_2Na.3H_2O$.

14. The method of claim 13, wherein the $CuSO_4.5H_2O$ is present in an amount of between about 2.5 g/l to about 25 g/l.

15. The method of claim 13, wherein the $Na_2EDTA.2H_2O$ is present in an amount of between about 4.75 g/l to about 47.5 g/l.

16. The method of claim 13, wherein the HCHO (37%) is present in an amount of between about 2.5 ml/l to about 25 ml/l.

17. The method of claim 13, wherein the EDA is present in an amount of between about 11.2 ppm to about 112 ppm.

18. The method of claim 13, wherein the $K_4Fe(CN)_6.3H_2O$ is present in an amount of between about 3.5 ppm to about 35 ppm.

19. The method of claim 13, wherein the $(C_2H_5)_2NCS_2Na.3H_2O$ is present in an amount of between about 0.5 ppm to about 5 ppm.

20. The method of claim 13, wherein the pH of the copper plating bath is between about 12 to about 12.7.

21. The method of claim 13, wherein the temperature of the copper plating bath is between about 20° to about 25° C.

22. The method of claim 13, wherein the copper plating bath has a composition of about 25 g/l of $CuSO_4.5H_2O$, 47.5 g/l of Na$_2$EDTA.2H$_2$O, 25 ml/l HCHO (37%), 112 ppm of EDA, 35 ppm of K$_4$Fe(CN)$_6$.3H$_2$O, and 5 ppm of (C$_2$H$_5$)$_2$NCS$_2$Na.3H$_2$O.

23. The method of claim 14, wherein the pH of the copper plating bath is about 12.

24. The method of claim 14, wherein the temperature of the copper plating bath is between about 20° to about 25° C.

25. The method of claim 13, wherein the copper plating bath has a composition of about 2.5 g/l of CuSO$_4$.5H$_2$O, 4.75 g/l of Na$_2$EDTA.2H$_2$O, 2.5 ml/l HCHO (37%), 11.2 ppm of EDA, 3.5 ppm of K$_4$Fe(CN)$_6$.3H$_2$O, and 0.5 ppm of (C$_2$H$_5$)$_2$NCS$_2$Na.3H$_2$O.

26. The method of claim 25, wherein the copper plating bath has a pH of approximately 12.7.

27. The method of claim 25, wherein the temperature of the copper plating bath is between about 20° to about 25° C.

28. The method of claim 12, wherein the copper plating bath is agitated.

29. The method of claim 28, wherein the copper plating bath is agitated at about 400 rpm.

30. The method of claim 1, wherein the galvanic displacement bath is agitated.

31. The method of claim 30, wherein the galvanic displacement bath is agitated at about 400 rpm.

32. The method of claim 1, wherein the galvanic displacement bath includes PdCl$_2$.

33. The method of claim 32, wherein the galvanic displacement bath has a composition of about 1.0 g/l of PdCl$_2$.

34. The method of claim 1, wherein the membrane is annealed in the presence of H$_2$.

35. The method of claim 34, wherein the membrane is annealed for between 24 hours to 144 hours.

36. The method of claim 35, wherein the membrane is annealed at about 450° C.

37. The method of claim 36, wherein the membrane is annealed for between 24 to 36 hours.

38. A membrane having a tri-layer of palladium/copper/palladium, wherein the membrane is made by:
   a) forming a palladium layer;
   b) depositing a layer of copper on the palladium layer;
   c) galvanically displacing a portion of the copper with palladium; and
   d) annealing the layers of palladium and copper to form the membrane.

39. The membrane of claim 38, wherein the membrane has a permeance of at least 90% of the theoretical permeance of a Pd membrane.

40. The membrane of claim 39, wherein the membrane has a permeance of about 93% of the theoretical permeance of a Pd membrane.

41. The membrane of claim 38, wherein the palladium layer is between about 5 µm and about 11 µm.

42. The membrane of claim 38, wherein the gravimetric thickness of the copper layer prior to the galvanic displacement step is between about 0.9 µm and about 1.7 µm.

43. The membrane of claim 38, wherein the thickness of the surface palladium layer resulting from the galvanic displacement step is about 0.15 µm.

44. The membrane of claim 38, wherein x-ray diffraction indicates the presence of a Pd/Cu fcc alloy.

* * * * *